United States Patent Office 3,071,579
Patented Jan. 1, 1963

3,071,579
7-ACYLTHIO DERIVATIVES OF 21-ACYLOXY-17α-HYDROXY-Δ⁴-PREGNENE-3,20-DIONES
Howard J. Ringold and Otto Halpern, Mexico City, Mexico, assignors, by mesne assignments, to Syntex Corporation, a corporation of Panama
No Drawing. Filed June 7, 1960, Ser. No. 34,369
Claims priority, application Mexico June 12, 1959
27 Claims. (Cl. 260—239.55)

The present invention relates to novel cyclopentanophenanthrene compounds and to a process for preparing same.

More particularly the invention relates to novel acylthio derivatives of 21-acyloxy-17α-hydroxy-Δ⁴-pregnene-3,20-diones which contain either a α-hydroxy, α-acyloxy, α-methyl or β-methyl group at C–16 or a cyclic acetal or cyclic ketal group at C–16,17 and which may also contain an additional double bond at C–1,2 and/or at C–6,7.

The novel compounds of the present invention are potent diuretic agents which inhibit the activity of desoxycorticosterone and/or of aldosterone and can be represented by the following formulas:

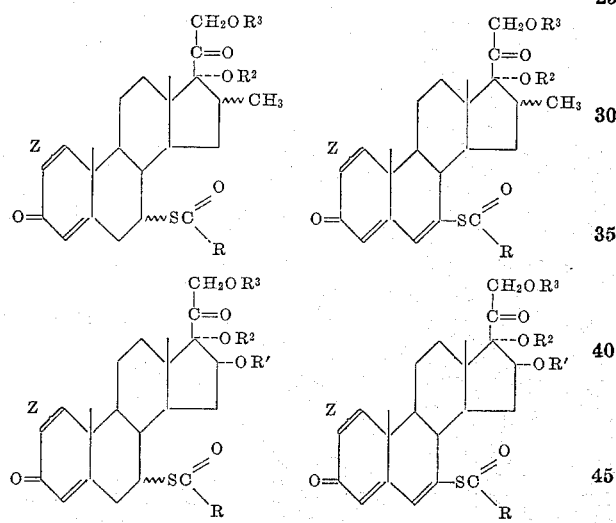

In the above formulas, Z indicates a double bond or a saturated linkage between C–1 and C–2; R represents a lower alkyl group containing up to 8 carbon atoms, an aryl group or an aralkyl group containing up to 10 carbon atoms; R' and R² each represent hydrogen or an acyl group; R' and R² jointly represent the grouping

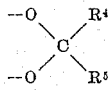

wherein R⁴ and R⁵ represent hydrogen or an aliphatic hydrocarbon group containing up to 8 carbon atoms, of straight, branched, cyclic or cyclic-aliphatic chain, saturated or unsaturated and including aromatic or araliphatic groups; and R³ represents acyl.

The acyl groups are derived from hydrocarbon carboxylic acids containing up to 12 carbon atoms or from acids such as sulfuric or phosphoric. The carboxylic acids may be saturated or unsaturated, straight chain or branched chain aliphatic, cyclic-aliphatic, aromatic, and may be substituted with amino, halogen, alkoxy groups containing up to 8 carbon atoms or acyloxy groups containing up to 12 carbon atoms. Typical examples of such ester groups are the acetate, propionate, butyrate, hemisuccinate, enanthate, caproate, benzoate, aminoacetate, trimethylacetate, phenoxyacetate, cyclopentylpropionate, phenylpropionate and β-chloropropionate. The esterified compounds may also be in the form of water soluble salts such as for example the alkali metal salts of hemisuccinate or of an ester formed with phosphoric acid or the hydrohalides of esters formed with an aminoacid.

The ketal or acetal group is derived from an aliphatic ketone or aldehyde containing up to 8 carbon atoms of straight, branched, cyclic or cyclic-aliphatic chain, or from an aromatic or araliphatic ketone or aldehyde.

The cyclic ketal or acetal is formed by the reaction of the 16,17-glycol with the ketone or aldehyde in the presence of an acid catalyst such as perchloric acid. Typical ketones and aldehydes employed are acetone, formaldehyde, acetaldehyde, paraldehyde, acetophenone, benzophenone, methyl ethyl ketone, cyclohexanone or diethyl ketone.

The wavy line at C–7 and at C–16 indicates both the α and β steric configuration.

The novel compounds of the present invention are prepared by a process illustrated by the following equation:

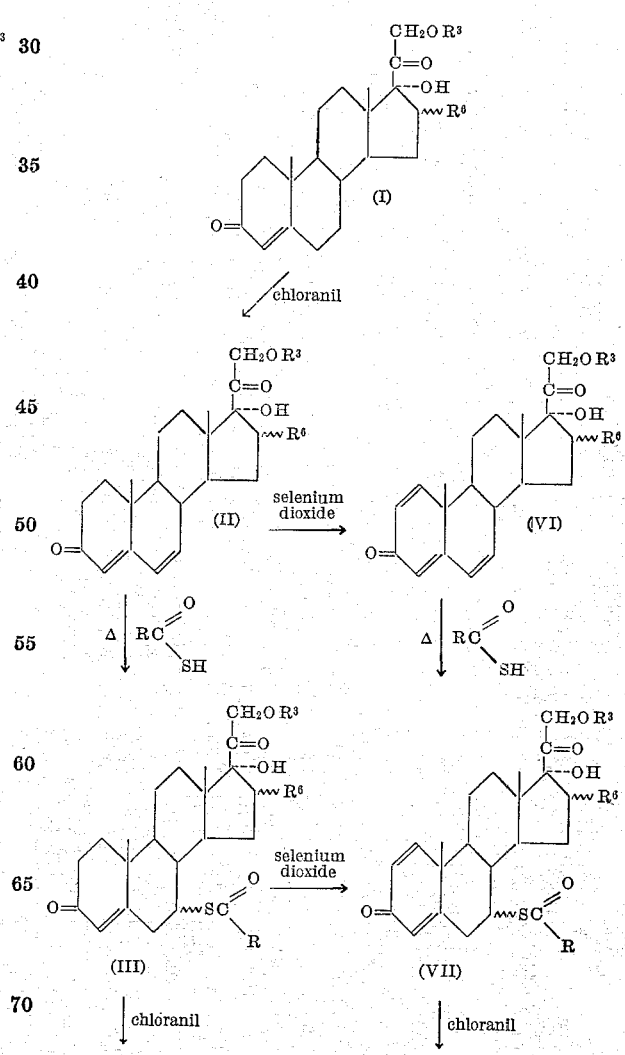

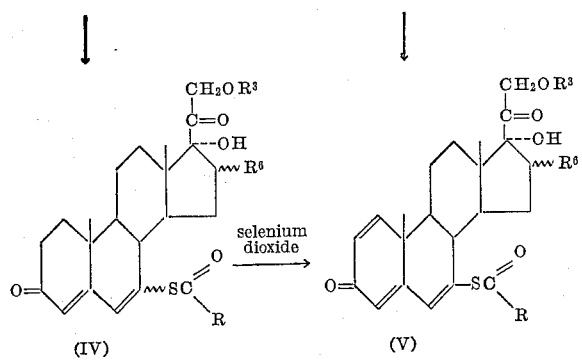

In the above formulas R and R³ have the same meaning as set forth previously; R⁶ represents α-hydroxy, α-acyloxy, (α or β)-methyl, or with the C–17α-hydroxyl group, a cyclic ketal or acetal group of the type previously set forth.

In practicing the process outlined above, a 16-substituted-21-acyloxy-Δ⁴-pregnen-17α-ol-3,20-dione (I) is refluxed with an excess of a quinone having an oxidation-reduction potential of less than —0.5, and preferably those having potential of —0.65 or less, such as tetrachloro-p-benzoquinone (chloranil), 1,2 or 1,4-naphthoquinone, in an inert solvent such as tertiary butanol, xylene or a mixture of ethyl acetate and acetic acid or tertiary amyl acetate and acetic acid. The thus formed 16-substituted-21-acyloxy - Δ⁴,⁶ - pregnadien-17α-ol-3,20-dione (II) is condensed with a thiolic acid, preferably thioacetic acid, to form the 7-thioacetyl-16-substituted-21-acyloxy-Δ⁴-pregnen-17α-ol-3,20-dione (III). The latter, in which the C–7 substituent is predominantly in α steric configuration, may then be dehydrogenated at C–1,2 by refluxing with an excess of selenium dioxide in a solvent such as tertiary butanol and in the presence of catalytic amounts of pyridine under an atmosphere of nitrogen for about 48 hours, or by microbiological methods such as by incubation with *Corynebacterium simplex* ATCC 6946 to form the 7-thioacetyl-16-substituted-21-acyloxy-Δ¹,⁴-pregnadiene-17α-ol-3,20-dione (VII), which compound may be further dehydrogenated at C–6,7 as by treatment with chloranil as set forth previously to produce the 7 - thioacetyl-16-substituted-21-aryloxy-Δ¹,⁴,⁶-pregnatriene-17α-ol-3,20-dione (V).

Alternatively, the 7-thioacetyl-16-substituted-21-acyloxy-Δ⁴-pregnen-17α-ol-3,20-dione (III) may first be dehydrogenated at C–6,7 as by treatment with chloranil to form 7-thioacetyl-16-substituted - 21 - acyloxy-Δ⁴,⁶-pregnadiene-17α-ol-3,20-dione(IV) which may further be dehydrogenated at C–1,2 in the same manner set forth above to form the 7-thioacetyl-16-substituted - 21 - acyloxy-Δ¹,⁴,⁶-pregnatriene-17α-ol-3,20-dione (V).

In another aspect of the invention, the 16-substituted-21-acyloxy - Δ⁴,⁶ - pregnadien-17α-ol-3,20-dione (II) may first be dehydrogenated at C–1,2 to form the corresponding Δ¹,⁴,⁶-pregnatriene compound (VI) and then subsequently reacted with the thioacetic acid to form the 7-thioacetyl-16-substituted-21-acyloxy - Δ¹,⁴ - pregnadien-17α-ol-3,20-dione (VII), which upon further treatment with chloranil is further dehydrogenated at C–6,7 to produce the corresponding Δ¹,⁴,⁶-pregnatriene (V).

The C–21 acyloxy group may be conventionally saponified as by treatment with dilute methanolic potassium hydroxide at 0° C. and then re-esterified by conventional methods such as by reaction with an acid anhydride or chloride in pyridine solution at room temperature. The hydroxyl group at C–16 is similarly esterified by conventional methods while the C–17α hydroxyl group may be esterified by reaction with the acid anhydrides in benzene solution in the presence of p-toluenesulfonic acid at room temperature, with simultaneous esterification of free hydroxyl groups at C–16 or C–21. Thus the same or mixed diesters or triesters can be produced.

The following examples serve to illustrate but are not intended to limit the scope of the present invention:

*Example I*

A mixture of 5 g. of the 21-acetate of 16α-methyl-Δ⁴-pregnene-17α,21-diol-3,20-dione, described by Edwards et al., J. Chem. Soc. 1959, 87, 200 cc. of t-butanol and 10 g. of chloranil was refluxed under an atmosphere of nitrogen for 8 hours, cooled, filtered and the filter was washed with ethyl acetate. The filtrate and washings were combined, evaporated to dryness under reduced pressure, the residue was dissolved in ethyl acetate and the solution was washed with cold aqueous sodium hydroxide solution until the washings were colorless and then with water to neutral. The solution was dried over anhydrous sodium sulfate and the ethyl acetate was evaporated, finally under reduced pressure; the residue was purified by recrystallization from acetone-hexane, thus yielding the 21-acetate of 16α-methyl - Δ⁴,⁶ - pregnadiene-17α,21-diol-3,20-dione, M.P. 210–215° C., λ max. 285 mμ, log ε 4.30.

A mixture of 2 g. of the above compound and 6 cc. of thioacetic acid was heated on the steam bath for 3 hours, cooled and the precipitate was collected by filtration and washed with a little cold ether. There was thus obtained the 21-acetate of 7-thioacetyl-16α-methyl-Δ⁴-pregnene-17α,21-diol-3,20-dione with its thioacetyl group predominantly in the α-position, M.P. 170–178° C., λ max. 239 mμ, log ε 4.25 and 306 mμ, log ε 2.48.

A mixture of 1 g. of the above compound, 300 mg. of selenium dioxide, 75 cc. of t-butanol and a few drops of pyridine was refluxed for 48 hours under an atmosphere of nitrogen and then filtered through celite; the solution was evaporated to dryness under reduced pressure, the residue was dissolved in 50 cc. of acetone and refluxed with 2 g. of decolorizing charcoal for 1 hour. It was then filtered, the filtrate was evaporated to dryness and the residue chromatographed on silica gel, thus affording the 21-acetate of 7-thioacetyl-16α-methyl-Δ¹,⁴-pregnadiene-17α,21-diol-3,20-dione.

The above compound was then treated with chloranil, exactly as described for the reaction of this substance with the 21-acetate of 16α-methyl-Δ⁴-pregnene-17α,21-diol-3,20-dione to produce the 21-acetate of 7-thioacetyl-16α-methyl-Δ¹,⁴,⁶-pregnatriene-17α,21-diol-3,20-dione.

*Example II*

A mixture of 5 g. of the 21-acetate of 16α-methyl-Δ⁴-pregnene-17α,21-diol-3,20-dione, 10 g. of chloranil, 125 cc. of ethyl acetate and 25 cc. of acetic acid was refluxed under an atmosphere of nitrogen for 72 hours; it was then filtered through celite, cooled and washed with cold 5% aqueous sodium hydroxide solution until the washings were colorless and then with water to neutral. After drying over anhydrous sodium sulfate the solvent was evaporated and the residue purified by recrystallization from acetone-hexane, thus furnishing the 21-acetate of 16α-methyl-Δ⁴,⁶-pregnadiene-17α,21-diol-3,20 - dione, identical with the intermediary obtained in accordance with the method described in the preceding example.

2 g. of the above compound was then refluxed with 4 g. of thiobenzoic acid in 50 cc. of benzene for 4 hours, cooled, concentrated to a small volume, and diluted with a little cold ether. The precipitate of the 21-acetate of 7-thiobenzoyl-16α-methyl-Δ⁴-pregnene - 17α,21 - diol-3,20-dione formed was collected by filtration, washed with a little cold ether and dried.

By subsequent reaction with selenium dioxide (cf. Example I) there was obtained the 21-acetate of 7-thiobenzoyl-16α-methyl - Δ¹,⁴ - pregnadiene-17α,21-diol-3,20-dione, and then, by dehydrogenation with chloranil in t-butanol in accordance with the method of Example I, there was obtained the 21-acetate of 7-thiobenzoyl-16α-methyl-Δ¹,⁴,⁶-pregnatriene-17α,21-diol-3,20-dione.

Example III 2 g. of the 21-acetate of 7-thioacetyl-16α-methyl-Δ⁴-pregnene-17α,21-diol-3,20-dione (see Example I) as well as 2 g. of the 21-acetate of 7-thiobenzoyl-16α-methyl-Δ⁴-pregnene-17α,21-diol-3,20-dione (see Example II) were treated first with chloranil, in accordance with the method of Example I, and then with selenium dioxide, also in accordance with the procedure described in such example. There were thus obtained as intermediates the 21-acetate of 7-thioacetyl-16α-methyl-Δ⁴,⁶-pregnadiene-17α,21-diol-3,20-dione and 21-acetate of 7-thiobenzoyl-16α-methyl-Δ⁴,⁶-pregnadiene-17α,21-diol-3,20-dione and then the final 1,4,6-trienes.

Example IV

In accordance with the methods described in the preceding examples, the 21-propionate of 16β-methyl-Δ⁴-pregnene-17α,21-diol-3,20-dione described in copending application Serial No. 824,199, filed July 1, 1959, was converted into its 6-dehydro derivative and subsequently treated with thioacetic acid to form the 21-propionate of 7 - thioacetyl - 16β - methyl - Δ⁴ - pregnene - 17α,21 - diol-3,20-dione. The latter was then converted into the 1-dehydro, 6-dehydro and 1,6-bis-dehydro derivatives in the same manner as described in the previous examples.

Example V 3.0 g. of the 21-acetate of Δ⁴-pregnene-16α,17α,21-triol-3,20-dione in 40 cc. of acetone was treated with 0.4 cc. of 70% perchloric acid and stirred for 1 hour at room temperature, poured into 200 cc. of 10% aqueous sodium bicarbonate solution and the precipitate was collected by filtration, washed with water, dried and recrystallized from acetone-hexane. There was thus obtained the acetonide of Δ⁴-pregnene-16α,17α,21-triol-3,20-dione 21-acetate.

By following the methods described in Examples I, II, and III, the latter compound was converted into the 21-acetate of 7-thiocetyl-16α,17α-isopropylidenedioxy-Δ⁴-pregnene-21-ol-3,20-dione and then into its 1-dehydro, 6-dehydro and 1,6-bis-dehydro derivatives and into the corresponding 7-thiobenzoyl derivatives of the foregoing compounds.

Example VI

By conventional methods of esterification Δ⁴-pregnene-16α,17α,21-triol-3,20-dione was converted into the 16,21-dipropionate thereof, which, in accordance with the methods described in Examples I, II and III, was transformed into the 16,21-dipropionate of 7-thioacetyl-Δ⁴-pregnene-16α,17α,21-triol-3,20-dione; the 16,21-dipropionate of 7-thioacetyl - Δ¹,⁴ - pregnadiene - 16α,17α,21 - triol - 3,20-dione; the 16,21-dipropionate of 7-thioacetyl-Δ⁴,⁶-pregnadiene-16α,17α,21-triol-3,20-dione; the 16,21-dipropionate of 7-thioacetyl-Δ¹,⁴,⁶-pregnatriene-16α,17α,21-triol-3,20-dione as well as the corresponding 7-thiobenzoyl derivatives of the foregoing compounds.

Example VII

By following an analogous procedure to that described in Example V, there was prepared instead of the 16,17-acetonide the 16,17-ethylidenedioxy acetal by substituting the acetone by acetaldehyde, and, by following the procedures described in Examples I, II and II, there were formed the 21-acetate of 7-thioacetyl-16α,17α-ethylidenedioxy-Δ⁴-pregnen-21-ol-3,20-dione, the 21-acetate of 7-thioacetyl - 16α,17α - ethylidenedioxy - Δ⁴,⁶ - pregnadien-21-ol-3,20-dione, the 21-acetate of 7-thioacetyl-16α,17α-ethylidenedioxy -Δ¹,⁴ - pregnadien - 21- ol - 3,20 - dione and the 21-acetate of 7-thioacetyl-16α,17α-ethylidenedioxy-Δ¹,⁴,⁶-pregnatrien-21-ol-3,20-dione as well as the corresponding 7-thiobenzoyl derivatives.

Example VIII

By employing the corresponding 21-cyclopentylpropionate of Δ⁴-pregnene-16α,17α,21-triol-3,20-dione in the preceding example as the starting material, there were formed all of the products produced in such examples having cyclopentylpropionoxy group at C–21 instead of the acetoxy group at C–21.

Example IX

In accordance with the method described in Example I there was introduced a double bond at C–6,7 in the 21-acetate of Δ⁴-pregnene-16α,17α,21-triol-3,20-dione, thioacetic acid was then added to the latter to produce the 21-acetate of 7-thioacetyl-Δ⁴-pregnene-16α,17α,21-triol-3,20-dione. 1 g. of this compound was then treated with propionic anhydride in 5 cc. of pyridine, kept overnight at room temperature, poured into water, heated for half an hour on the steam bath, cooled and the precipitate was collected, washed with water, dried and recrystallized from acetone-hexane, thus producing the 16-propionate-21-acetate of 7-thioacetyl-Δ⁴-pregnene-16α,17α,21-triol-3,20-dione. By subsequent reaction with selenium dioxide, in accordance with the method described in Example I, there was obtained the 16-propionate-21-acetate of 7-thioacetyl - Δ¹,⁴ - pregnadiene - 16α,17α,21 - triol - 3,20-dione. 550 mg. of this diene was then treated with 12.5 cc. of acetic acid, 2.5 cc. of acetic anhydride and 500 mg. of p-toluenesulfonic acid, kept overnight at room temperature, poured into water, extracted with methylene chloride and the extract was washed with water to neutral, dried over anhydrous sodium sulfate and evaporated. Recrystallization of the residue from acetone-hexane afforded the 16-propionate-17,21-diacetate of 7-thioacetyl-Δ¹,⁴-pregnadiene-16α,17α,21-triol-3,20-dione. Finally, by the reaction with chloranil described in Example I, there was produced the 16-propionate-17,21-diacetate of 7-thioacetyl-Δ¹,⁴,⁶-pregnatriene-16α,17α,21-triol-3,20-dione.

Example X 1 g. of the 21-acetate of Δ⁴-pregnene-16α,17α,21-triol-3,20-dione was treated with chloranil, in accordance with the method of Example I, then with thioacetic acid; then there were introduced the double bonds at C–1,2 and C–6,7, also in accordance with such example; there was thus obtained the 21-acetate of 7-thioacetyl-Δ¹,⁴,⁶-pregnatriene-16α,17α,21-triol-3,20-dione. 1 g. of this compound in 50 cc. of anhydrous benzene was treated with 3 g. of propionic anhydride and 1 g. of p-toluenesulfonic acid monohydrate for 48 hours at room temperature; the mixture was washed with water, dried over anhydrous sodium sulfate and the benzene was evaporated. Recrystallization of the residue from acetone-hexane furnished the 16,17-dipropionate-21-acetate of 7-thioacetyl-Δ¹,⁴,⁶-pregnatriene-16α,17α,21-triol-3,20-dione.

We claim:
1. 7-thioacetyl - 16α - methyl-Δ¹,⁴-pregnadiene-17α,21-diol-3,20-dione-21-acetate.
2. 7-thiobenzoyl-16α-methyl - Δ⁴ - pregnene - 17α,21-diol-3,20-dione 21-acetate.
3. 7-thiobenzoyl-16α-methyl - Δ¹,⁴ - pregnadiene - 17α, 21-diol-3,20-dione 21-acetate.
4. 7-thioacetyl-16β-methyl - Δ⁴ - pregnene-17α,21-diol-3,20-dione 21-propionate.
5. A compound of the following formula:

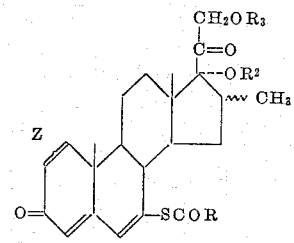

wherein R is selected from the group consisting of alkyl containing up to 8 carbon atoms, aryl and aralkyl containing up to 10 carbon atoms; $R^2$ is selected from the group consisting of hydrogen and a hydrocarbon carboxylic acyl group containing up to 12 carbon atoms; $R^3$ is a hydrocarbon carboxylic acyl group containing up to 12 carbon atoms and Z is selected from the group consisting of a double bond between C–1 and C–2 and a saturated linkage between C–1 and C–2.

6. 7-thioacetyl-16α - methyl - $\Delta^{1,4,6}$ - pregnatriene-17α, 21-diol-3,20-dione-21-acetate.

7. 7-thioacetyl - 16α - methyl-$\Delta^{4,6}$-pregnadiene-17α,21-diol-3,20-dione-21-acetate.

8. 7-thiobenzoyl-16α-methyl - $\Delta^{1,4,6}$ - pregnatriene-17α, 21-diol-3,20-dione-21-acetate.

9. 7-thiobenzoyl-16α-methyl - $\Delta^{4,6}$ - pregnadiene - 17α, 21-diol-3,20-dione-21-acetate.

10. 7-thioacetyl-16β-methyl - $\Delta^{4,6}$ - pregnadiene-17α,21-diol-3,20-dione-21-propionate.

11. 7-thioacetyl-16β-methyl - $\Delta^{1,4,6}$ - pregnatriene-17α, 21-diol-3,20-dione-21-propionate.

12. A compound of the following formula:

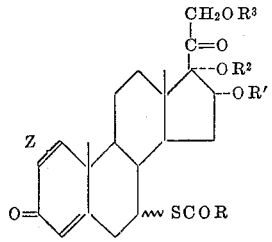

wherein R is selected from the group consisting of alkyl containing up to 8 carbon atoms, aryl and aralkyl containing up to 10 carbon atoms; R' and $R^2$ are selected from the group consisting of hydrogen and a hydrocarbon carboxylic acyl group containing up to 12 carbon atoms; $R^3$ is a hydrocarbon carboxylic acyl group containing up to 12 carbon atoms; and Z is selected from the group consisting of a double bond between C–1 and C–2 and a saturated linkage between C–1 and C–2.

13. The 16,21-dipropionate of 7-thioacetyl-$\Delta^4$-pregnene-16α,17α,21-triol-3,20-dione.

14. The 16,21-dipropionate of 7-thioacetyl-$\Delta^{1,4}$-pregnadiene-16α,17α,21-triol-3,20-dione.

15. The 16-propionate-17,21-diacetate of 7-thioacetyl-$\Delta^{1,4}$-pregnadiene-16α,17α,21-triol-3,20-dione.

16. A compound of the following formula:

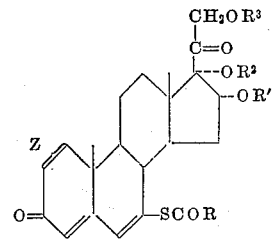

wherein R is selected from the group consisting of alkyl containing up to 8 carbon atoms, aryl and aralkyl containing up to 10 carbon atoms; R' and $R^2$ are selected from the group consisting of hydrogen and a hydrocarbon carboxylic acyl group containing up to 12 carbon atoms; $R^3$ is a hydrocarbon carboxylic acyl group containing up to 12 carbon atoms; and Z is selected from the group consisting of a double bond between C–1 and C–2 and a saturated linkage between C–1 and C–2.

17. The 16-propionate-21-acetate of 7-thioacetyl-$\Delta^{4,6}$-pregnadiene-16α,17α,21-triol-3,20-dione.

18. The 16,21-dipropionate of 7-thioacetyl-$\Delta^{1,4,6}$-pregnatriene-16α,17α,21-triol-3,20-dione.

19. The 16-propionate-17,21-diacetate of 7-thioacetyl-$\Delta^{1,4,6}$-pregnatriene-16α,17α,21-triol-3,20-dione.

20. The 16,17-dipropionate-21-acetate of 7-thioacetyl-$\Delta^{1,4,6}$-pregnatriene-16α,17α,21-triol-3,20-dione.

21. A compound of the following formula:

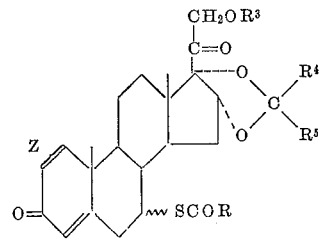

wherein R is selected from the group consisting of alkyl containing up to 8 carbon atoms, aryl and aralkyl containing up to 10 carbon atoms; $R^3$ is a hydrocarbon carboxylic acyl group containing up to 12 carbon atoms; $R^4$ and $R^5$ are selected from the group consisting of hydrogen and an aliphatic hydrocarbon group containing up to 8 carbon atoms, and Z is selected from the group consisting of a double bond between C–1 and C–2 and a saturated linkage between C–1 and C–2.

22. 7 - thioacetyl - 16α,17α - isopropylidenedioxy - $\Delta^4$-pregnen-21-ol-3,20-dione 21-acetate.

23. 7 - thioacetyl - 16α,17α - isopropylidenedioxy - $\Delta^{1,4}$-pregnadien-21-ol-3,20-dione-21-acetate.

24. 7 - thioacetyl - 16α,17α - ethylidenedioxy - $\Delta^4$-pregnen-21-ol-3,20-dione-21-cyclopentylpropionate.

25. A compound of the following formula:

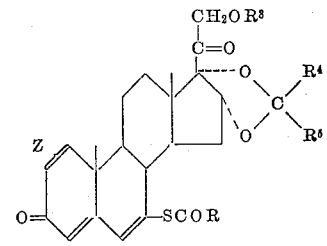

wherein R is selected from the group consisting of alkyl containing up to 8 carbon atoms, aryl and aralkyl containing up to 10 carbon atoms; $R^3$ is a hydrocarbon carboxylic acyl group containing up to 12 carbon atoms; $R^4$ and $R^5$ are selected from the group consisting of hydrogen and an aliphatic hydrocarbon group containing up to 8 carbon atoms; and Z is selected from the group consisting of a double bond between C–1 and C–2 and a saturated linkage between C–1 and C–2.

26. 7 - thioacetyl - 16α,17α - isopropylidenedioxy-$\Delta^{4,6}$-pregnadiene-21-ol-3,20-dione-21-acetate.

27. 7 - thioacetyl - 16α,17α - ethylidenedioxy - $\Delta^{1,4,6}$-pregnatriene-21-ol-3,20-dione-21-cyclopentylpropionate.

References Cited in the file of this patent

UNITED STATES PATENTS

| | | |
|---|---|---|
| 2,837,464 | Nobile et al. | June 3, 1958 |
| 2,904,560 | Dodson et al. | Sept. 15, 1959 |